UNITED STATES PATENT OFFICE.

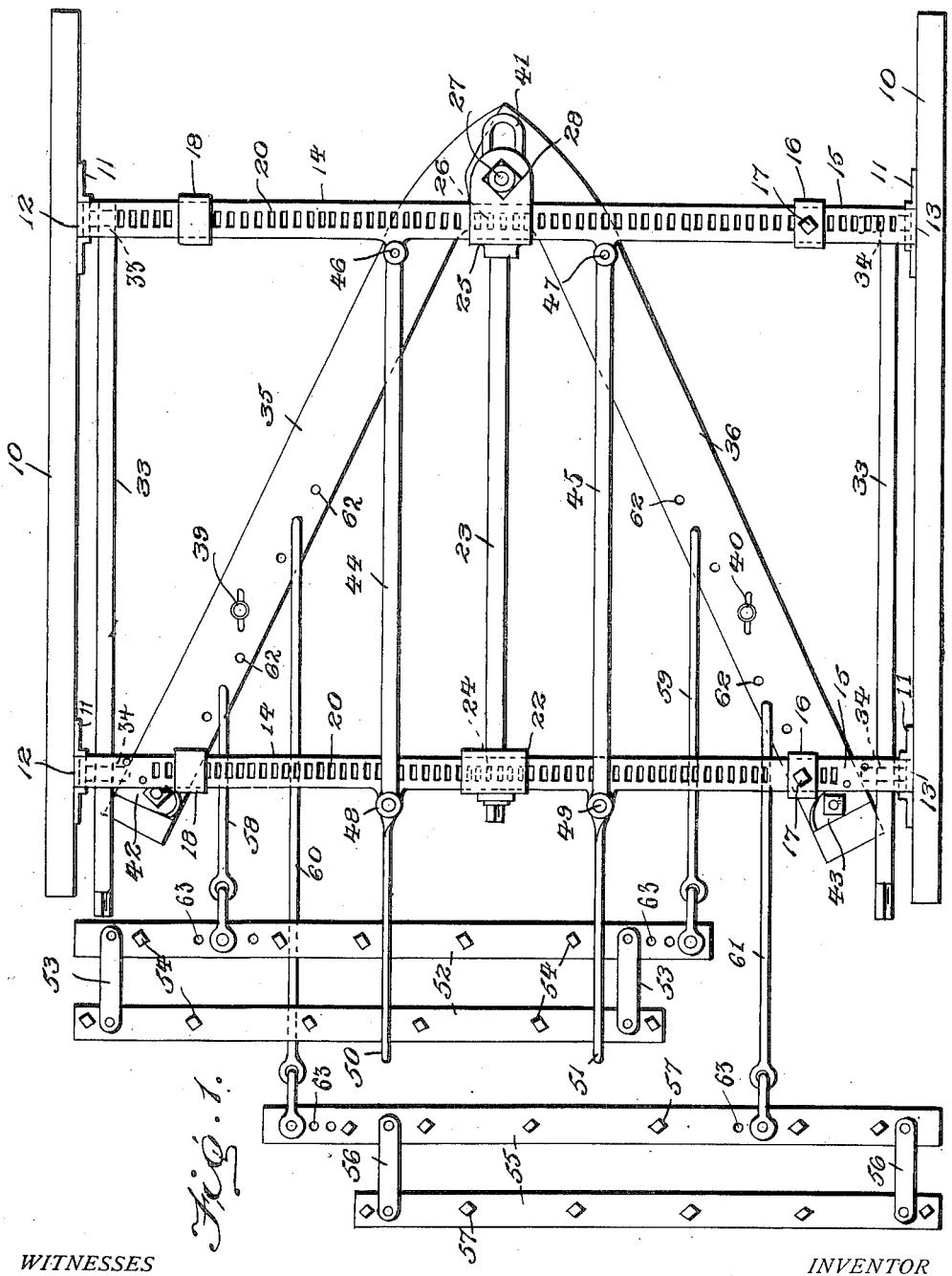

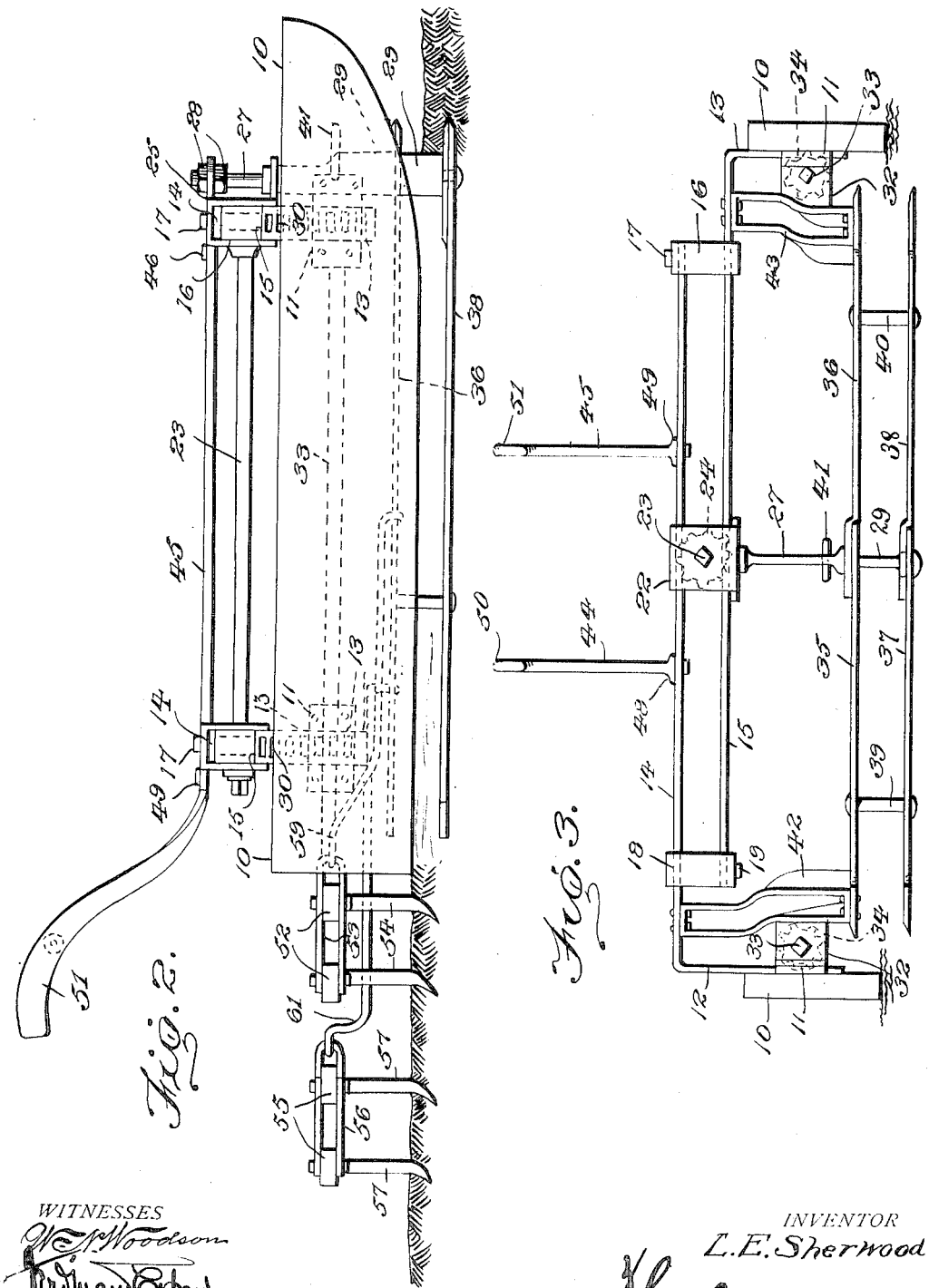

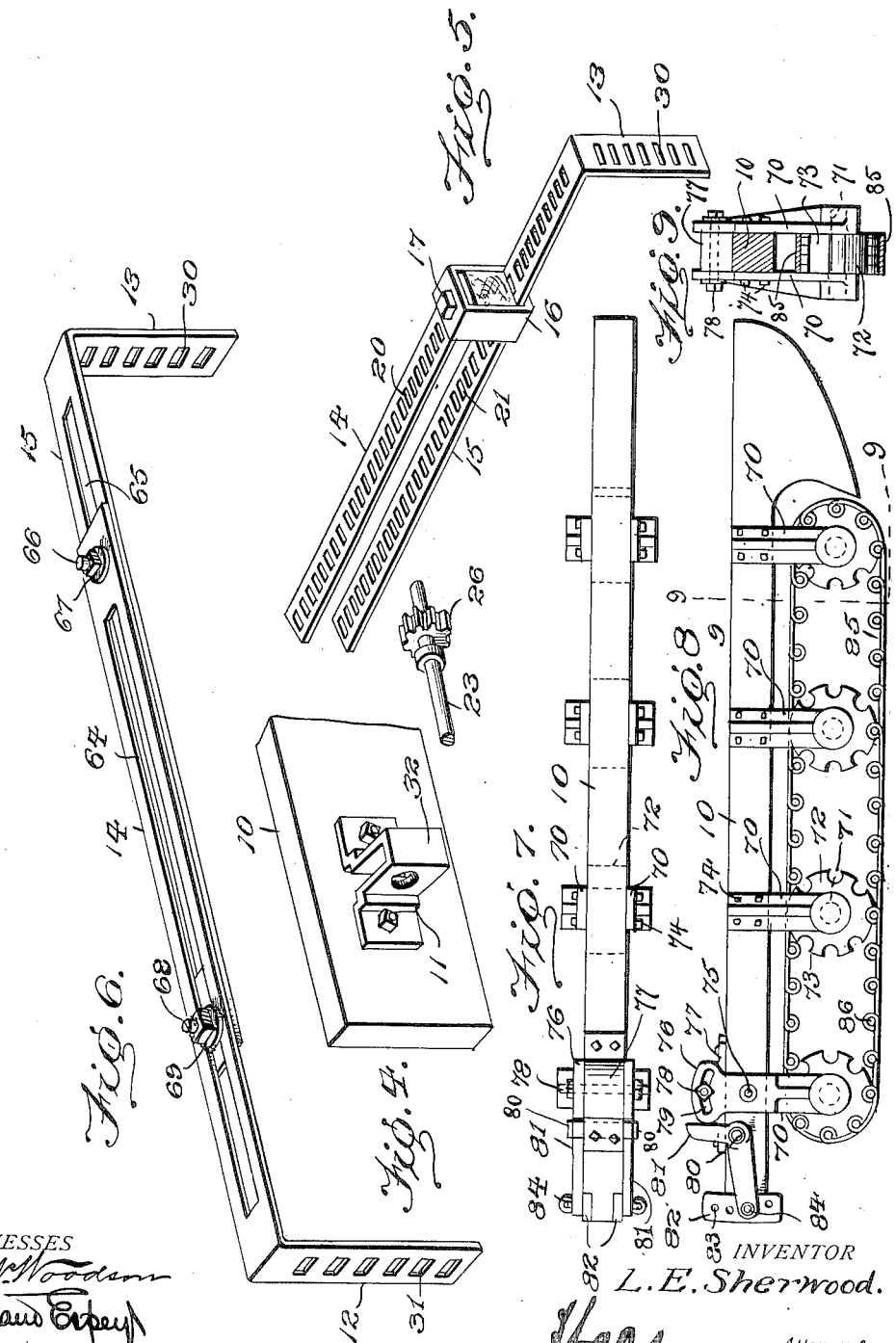

LOWELL E. SHERWOOD, OF HARRINGTON, WASHINGTON.

COMBINED CULTIVATOR AND WEED-KILLER.

1,067,765.  Specification of Letters Patent.  Patented July 15, 1913.

Application filed October 3, 1912. Serial No. 723,753.

*To all whom it may concern:*

Be it known that I, LOWELL E. SHERWOOD, citizen of the United States, residing at Harrington, in the county of Lincoln and State of Washington, have invented certain new and useful Improvements in Combined Cultivators and Weed-Killers, of which the following is a specification.

This invention relates to agricultural implements of the class adapted to destroy weeds and likewise to cultivate the ground, and has for one of its objects to provide a device whereby the weeds are destroyed by severing them both beneath and above the ground to effectually destroy both the roots and the stocks.

Another object of the invention is to provide a device of this character combining a weed destroyer and a cultivator, the cultivator devices being arranged to coact with the weed destroying devices and to supplement and complete the operation.

Another object of the invention is to provide a device of this character which may be adjusted to increase or decrease its size and the spread of the operating parts.

With these and other objects in view the invention consists in certain novel features of construction which will be hereinafter shown and described and then specifically pointed out in the claims.

Figure 1 is a plan view of the improved device. Fig. 2 is a side elevation of the same. Fig. 3 is a rear elevation. Fig. 4 is a perspective view of one of the combined guide clips and gear supports. Fig. 5 is a perspective detail illustrating the construction of one form of the spreader mechanism. Fig. 6 is a perspective view of a modified form of the spreader mechanism. Fig. 7 is a plan view of a modified form of runner. Fig. 8 is a side view of the parts shown in Fig. 7. Fig. 9 is a section on the line 9—9 of Fig. 8.

Corresponding and like parts are referred to in the following description and indicated in all the views of the drawings by the same reference characters.

The improved device comprises coacting runners 10 and the operating parts are connected to these runners.

Connected to the inner faces of the runners 10 near their forward and rear ends are keepers or guide-ways 11 and operating vertically within the keepers are the down-turned terminals 12—13 of flat bars 14—15. The bar 14 is provided with a housing 16 rigidly connected thereto at 17, while the bar 15 is provided with a similar housing 18 rigidly connected thereto at 19. The bars 14—15 are spaced a considerable distance apart and are relatively slidable longitudinally. The bar 14 is provided with a plurality of elongated perforations spaced apart and indicated conventionally at 20, while the bar 15 is provided with a similar series of elongated perforations indicated at 21, the perforations serving as gear teeth. Each opposite pair of the guide members 11 is provided with a set of the bars 14—15 precisely alike and indicated by the same reference characters.

The rear pair of bars 14—15 is surrounded by a keeper or guard member 22 including vertical forward and rearward members through which a shaft 23 is mounted for rotation, and provided with a gear pinion 24 which engages the teeth 20—21 of the rear pair of bars 14—15. Surrounding the forward pair of bars 14—15 is another similar keeper 25 which includes a rear vertical member through which the forward end of the shaft 23 passes and is provided with a gear pinion 26 to engage in the teeth 20—21 of the forward pair of bars 14—15. The keeper 25 is extended forwardly and receives the upper end of a vertical post or standard 27 which is rigidly secured in position by clamping nuts 28 or like securing devices. The member 27 extends below the keeper 25 and is flattened and widened as indicated at 29 and sharpened at its forward edge so that it cuts through the soil as the device is moved forwardly and thus reduces the friction, as hereafter explained.

Each of the down-turned portions 13 of the bars 15 is provided with a plurality of elongated apertures indicated at 30 and constituting gear teeth, while similar oblong apertures 31 are formed in the down-turned terminals 12 and likewise constitute gear teeth. The keepers or guide members 11 are each provided with inwardly directed housing 32 including spaced side members through which a shaft 33 is journaled, one of the shafts being located adjacent to the inner face of each of the runners 10. Each of the shafts 33 is provided with a gear pinion 34 which engages respectively with the teeth 30—31. At their rear ends the shafts 23 and 33 are squared to receive a turning crank. By this arrangement it will be obvious that if the shaft 23 is rotated in one direction the bars 14—15 will be moved inwardly and draw the runners 10 toward each other, and then if the motion of the shaft 23 be reversed the runners will be simultaneously moved away from each other. By this simple means the distance between the runners is readily controllable. It will also be obvious that if a rotary motion be imparted to the shafts 33 the bars 14—15 will be adjusted vertically, the object to be hereafter explained.

The weed destroyer feature of the improved device comprises upper cutter members 35—36 pivotally united at their forward ends to the lower end of the standard 27—29, and lower cutter members 37—38 likewise pivotally united to the same standard. The members 35—36 and 37—38 diverge rearwardly, as shown, and are coupled near their rear ends by vertical standards or spacer members 39—40. The upper members 35—36 are sharpened or knife-edged at their outer edges while the members 37—38 are likewise knife-edged at their outer edges. The members 35—36 are designed to travel above the soil, while the members 37—38 are designed to travel beneath the upper surface of the soil as they are moved forwardly.

Any suitable power may be applied to draw the machine over and through the ground, but for the purpose of illustration a link 41 is shown attached to the standard member 27—29 to which the horses are to be coupled.

The coupled members 35—37 are united at their rear ends to the rear member 14 by a suitable standard 42, while the coupled members 36—38 are similarly coupled by a suitable standard 43 to the rear member 15. By this means the coupled members 35—37 are adjusted simultaneously with the rear bar 14, while the coupled members 36—38 are likewise adjusted simultaneously with the rear bar 15. By this means the "spread" of the device is controlled by manipulating the shaft 23, and the depth of cut of the members 37—38 adjusted by manipulating the shafts 33.

Extending over the machine are handle members 44—45 coupled at 46—47 to the forward members 14 and coupled at 48—49 to the rear member 14. The handles extend rearwardly of the shoes or runners and terminate in hand grips 50—51. By this means efficient handles are connected to the device to enable the same to be guided over the ground.

The cultivator portion of the improved device is preferably formed in two sections, one section comprising tooth bars 52 coupled by straps 53 and provided with cultivator teeth 54, and a similar section formed of tooth bars 55 spaced apart and disposed in parallel relations and coupled by straps 56 and provided with tooth bars 57. The forward section 52 of the cultivator device is located at one side of the center of the machine as shown in Fig. 1, while the cultivator section 55 is located at the opposite side of the center of the machine and rearwardly of the section 52. The cultivator sections thus overlap each other and the teeth 54—57 are arranged in zigzag relations so that they do not "trail", but cultivate the soil at relatively close intervals. The forward tooth bar of the cultivator section 52 is coupled near one end by a rod 58 to the cutter member 35, and coupled near its opposite end by a rod 59 to the cutter member 36. The rear cultivator section 55 is coupled near one end by a rod 60 to the cutter member 35, while the same cultivator section is coupled near its opposite end to the cutter member 36 by a rod 61. The cutter member 35 is provided with a plurality of apertures where the rods 58—60 are coupled, while the cutter member 36 is likewise provided with a plurality of apertures where the rods 59—61 are united, the apertures being indicated at 62, while the tooth bars of the cultivator sections are likewise provided with a plurality of apertures spaced apart at the points where the rods are connected thereto and indicated at 63. By this means the requisite adjustments are provided for between the cultivator sections and the weed destroying members.

It will thus be obvious that a simply constructed and efficient device is produced whereby weeds are effectually destroyed both by cutting them off below the surface of the soil and likewise by severing them above the surface of the soil and then treating the severed and up-rooted weeds to the action of the cultivator teeth.

The improved apparatus will preferably be constructed of metal except the shoes or runners 10 and the tooth bars 52—55 of the cultivators, but all parts may be of metal if preferred. The members 14—15 are preferably formed of strap metal of sufficient strength to withstand the strains to which it will be subjected, and the perforations or apertures which constitute the teeth formed therein by suitable dies.

In Fig. 6 a modified construction of the members 14—15 is shown consisting in forming longitudinal slots 64—65 in the members in place of the apertures 20—21. The member 14 is provided with a clamp bolt 66 and clamp nuts 67, while a similar clamp bolt 68 and clamp nut 69 are carried by the member 15. The clamp bolt 66 extends through the slot 65 while the clamp bolt 68 extends through the slot 64. By this simple means the members 14—15 may be adjusted longitudinally to any required extent within the range of the slots and produce the same effect as the mechanism illustrated in Figs. 1, 2, and 3. This simple form of adjustment may be employed under certain conditions, if preferred.

In Figs. 7, 8 and 9 is shown a modified form of the runner device in each of which an endless bearing belt is employed to reduce the friction and improve the operation when employed upon certain kinds of soil. In the modified form of runner the body portion 10 is cut away in the lower part, except at the forward portion where the curved terminals remain, to facilitate the passage of the runners over weeds and other obstructions. Mounted upon the reduced portions of the runner at opposite sides are vertical hangers or brackets 70, and pivoted at 71 between each opposite pair of the hangers is a drum or roller 72 having radial protuberances or teeth 73, Any required number of the hangers or brackets may be employed, but ordinarily four will be used as shown. All of the brackets except the rear pair are rigidly connected by bolts or other suitable fastening devices 74 to the runner, while the rear pair of brackets are pivoted at 75 to the runner. Connected to the upper face of the runner opposite the rear bracket 70 is a standard or plate 77 having a clamp screw 78 extending therethrough. The rear brackets 70 are extended upwardly above the runner 10 and each is provided with a segmental slot 79 through which the clamp bolts 78 extend. By this arrangement the rear brackets 70 are free to swing upon their pivots 75 and be clamped in their adjusted position through the coaction of the segmental slots 79 and the clamp bolt 78. Pivoted at 80 to the runner 10 at opposite sides and rearwardly of the rear brackets 70, is a lever device 81 which bears at one point against the rear edges of the rear brackets 70 above the pivot point 75, and extends at its opposite ends over plates 82 having a plurality of segmental perforations 83 to receive a holding pin 84 which extends through the rear end of the lever 81. By this means it will be obvious that by adjusting the rear ends of the levers 81 vertically over the plates 83 the forward ends of the levers will exert force against the upper ends of the rear brackets 70 and thus force them forward and likewise force the lower ends of the rear brackets rearwardly. Bearing over the drums or rollers 72 is an endless chain device formed of flat links 85 pivotally united at 86. Each of the links 85 is formed from plate metal, preferably steel, and rolled at the ends around the pivots 86, the runners being presented inwardly and engaging in the interstices between the teeth 73 of the drums. The lower portions of the belts thus run upon the ground and materially reduce the friction when the device is drawn over the ground, while at the same time serving as crushers upon the weeds. By mounting the rear brackets 70 to swing upon the pivots 75 and providing the adjusting levers 81 to operate against the upper portion of the rear brackets, a simply constructed tension device is produced whereby the slack of the belts may be controlled and adjusted as required, and the tension retained by setting up on the clamp bolt 78.

Having thus described my invention, what I claim is:

1. In a device of the class described, upper cutter members hingedly united at one end, lower cutter members hingedly united at one end, means for supporting said cutter members with the upper cutter members operating above the surface of the soil and the lower cutter members operating below the surface of the soil, means for laterally adjusting the free ends of said coupled cutter member to control the width of the cut of the same, and coacting cultivator devices connected to said cutters and movable laterally therewith.

2. In a device of the class described supporting devices spaced apart and adapted to travel upon the surface of the ground, an upper cutter device, a lower cutter device, coupling means uniting said cutter devices, means for connecting said coupled cutter devices to said supporting devices, whereby said upper cutter device is caused to travel above the soil and said lower cutter device is caused to travel beneath the surface of the soil, and coacting cultivator devices connected to said cutters and laterally movable therewith.

3. In an apparatus of the class described, supporting devices spaced apart and adapted to travel upon the surface of the ground, coupling members connected respectively to said supporting devices and overlapping, means for simultaneously adjusting said overlapping coupling members in opposite directions, an upper cutter device, a lower cutter device, means for coupling said cutter devices at their forward ends, and means for coupling said cutter devices at their rear ends to move with the ground engaging supporting devices.

4. In a device of the class described upper cutter members hingedly united at one end, lower cutter members hingedly united at one end, means for supporting said cutter members with the upper cutter members operating above the surface of the soil and lower cutter members operating below the surface of the soil, and means for laterally adjusting the free ends of said coupled cutter members to control the width of cut of the same.

5. In a device of the class described upper cutter members hingedly united at one end, lower cutter members hingedly united at one end, means for supporting said cutter members with the upper cutter members operating above the surface of the soil and the lower cutter members operating below the surface of the soil, and means for laterally adjusting the free ends of said coupled cutter members to control the width of cut of the same, and coacting cultivator devices coupled to said cutter member and movable laterally therewith.

6. In a device of the class described supporting devices spaced apart and adapted to travel over the surface of the ground, upper cutter members hingedly united, lower cutter members hingedly united, means for coupling said united cutter members to said supporting devices, and means for simultaneously adjusting the free ends of said cutter devices and supporting devices laterally.

7. In a device of the class described supporting devices spaced apart and adapted to travel over the surface of the ground, superimposed coupling members arranged in pairs and movably connected respectively to said supporting devices, means for adjusting said superimposed members longitudinally, a standard supported from one pair of said superimposed members, upper cutter members swingingly united to said standard, lower cutter members swingingly united to said standard, and means for coupling said cutter members to the other pair of said superimposed members.

8. In an apparatus of the class described, supporting devices spaced apart and adapted to travel upon the surface of the ground, coupling members connected respectively to said supporting devices and overlapping, means for simultaneously adjusting said overlapping coupling members in opposite directions, an intermediate coupling member connected to said overlapping coupling members, an upper cutter device, a lower cutter device, means for coupling said cutter devices at their forward ends to the intermediate coupling member, and means for connecting said cutter devices at their rear ends with the ground engaging supporting devices.

9. In an apparatus of the class described, supporting devices spaced apart and adapted to travel upon the surface of the ground, coupling members connected respectively to said supporting devices and overlapping, means for simultaneously adjusting said overlapping coupling members in opposite directions, a standard connected to said overlapping coupling members, an upper cutter device, a lower cutter device, means for coupling said cutter devices at their forward ends to said standard, and means for connecting said cutter devices at their rear ends to move with the ground engaging supporting devices.

10. In an apparatus of the class described, supporting devices spaced apart and adapted to travel upon the surface of the ground, guide keepers carried by said supporting devices, a pinion mounted in each of said guide keepers, connecting members overlapping and each provided with a vertical standard engaging in one of said guide keepers, each of said standards having a rack engaged by one of the pinions, means for simultaneously adjusting said overlapping coupling members in opposite directions, an upper cutter device, a lower cutter device, means for coupling said cutter devices at their forward ends, and means for connecting said cutter devices at their rear ends to move with the ground engaging supporting devices.

11. In an apparatus of the class described, upper cutter members hingedly united at one end, lower cutter members hingedly united at one end, means for supporting said cutter members with the upper cutter members operating above the surface of the soil and the lower cutter members operating below the surface of the soil, means for laterally adjusting the free ends of said coupled cutter members to control the width of the cut of the same, coacting cultivator devices arranged one behind the other and overlapping past each other, and means for independently connecting said cultivator devices to said upper cutter members.

12. In an apparatus of the class described, supporting devices spaced apart and adapted to travel upon the surface of the ground, guide keepers carried by said supporting devices, a pinion mounted in each of said guide keepers, connecting members overlapping and each provided with a vertical standard engaging in one of said guide keepers, each of said standards having a rack engaged by one of the pinions, a plurality of guide keepers carried by said overlapping connecting members, means for simultaneously adjusting said overlapping coupling members in opposite directions through said last mentioned guide keepers, an upper cutter device, a lower cutter device, means for coupling said cutter devices at their forward ends to one of said last mentioned guide keepers, and means for connecting said cutter devices at their rear ends to move with the ground engaging supporting devices.

13. In a device of the class described, supporting devices spaced apart and adapted to travel over the surface of the ground, means for coupling said supporting devices, means for adjusting said coupling devices, upper and lower cutter members connected to said coupling means, means for adjusting said cutters laterally, and coacting cultivator devices coupled to said cutter members and movable laterally therewith.

14. In a device of the class described, upper cutter members and lower cutter members hingedly united at one end, means for supporting said cutter members with the upper cutter members operating above the surface of the soil and the lower cutter members operating below the surface of the soil, means for adjusting the free ends of said coupled cutter members to control the width of the same, coacting cultivator devices movable laterally side by side, and coupling means between said cultivator devices and said cutters, whereby the cultivators are adjusted simultaneously with the cutter members.

In testimony whereof I affix my signature in presence of two witnesses.

LOWELL E. SHERWOOD. [L. S.]

Witnesses:
W. W. DOWNIE,
R. S. REID.